United States Patent [19]
Cole

[11] Patent Number: 4,696,609
[45] Date of Patent: Sep. 29, 1987

[54] PALLET RESTRAINT MECHANISM FOR CARGO LOADING SYSTEM

[75] Inventor: Stephen C. Cole, Hermosa Beach, Calif.

[73] Assignee: Ancra Corporation, Hawthorne, Calif.

[21] Appl. No.: 854,110

[22] Filed: Apr. 21, 1986

[51] Int. Cl.$^4$ .......................... B60P 1/64; B60P 7/13; B64C 1/22

[52] U.S. Cl. .................. 410/69; 244/118.1; 244/137.1; 410/79; 410/84

[58] Field of Search ............ 410/52, 69, 77–80, 410/84, 92, 95, 105; 244/118.1, 137 R, 137 L; 414/536

[56] References Cited

U.S. PATENT DOCUMENTS

| | | | |
|---|---|---|---|
| 3,381,921 | 5/1968 | McDonough et al. | 410/79 |
| 3,874,538 | 4/1975 | Kessler et al. | 410/92 X |
| 3,927,622 | 12/1975 | Voigt | 410/79 |
| 3,933,101 | 1/1976 | Blas | 410/69 |
| 4,134,345 | 1/1979 | Baldwin et al. | 244/137 R X |
| 4,388,030 | 6/1983 | Skaale | 410/69 |
| 4,415,298 | 11/1983 | Voigt | 410/69 |
| 4,457,649 | 7/1984 | Vogg et al. | 410/69 X |
| 4,462,493 | 7/1984 | Nordstrom | 410/92 X |

Primary Examiner—Randolph A. Reese
Attorney, Agent, or Firm—Edward A. Sokolski

[57] ABSTRACT

A cargo restraint device is automatically adaptable for the retention and conveyance of half size width or full size width pallets and containers on a floor mounted track in a vehicle such as an aircraft. A pair of similar wing portions are spring urged to an upright position opposite each other. Each of the wing portions has an arm which extends outwardly therefrom from a support plate in a direction substantially normal to the support plate, these wing portions being adapted to engage the edges of the pallets or containers to retain them to the track. A camming member has a camming arm which engages camming surfaces on the wing members. This camming member is spring urged upwardly so that the camming arm thereof firmly engages the camming surfaces of the wing members at all times. When a full size width pallet is loaded onto the loader, its bottom surface engages the camming member, driving it downwardly towards the track and causing its camming arm to drive the wing members away from each other until they are fully spaced apart in a flat position thereby permitting the pallet to ride over the camming member. Latching devices are provided to latch the wing members in either an upright or flat position, if so desired.

8 Claims, 11 Drawing Figures

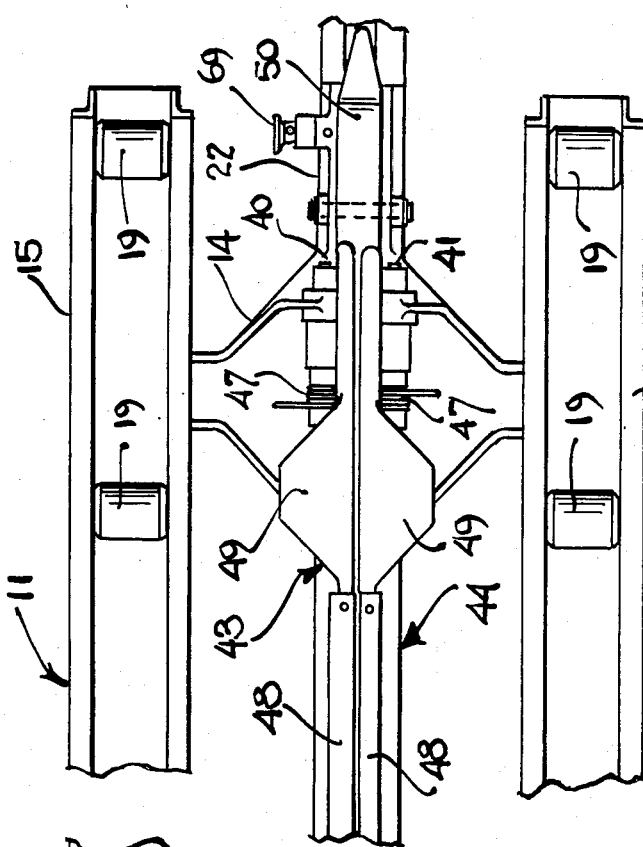
Fig.1
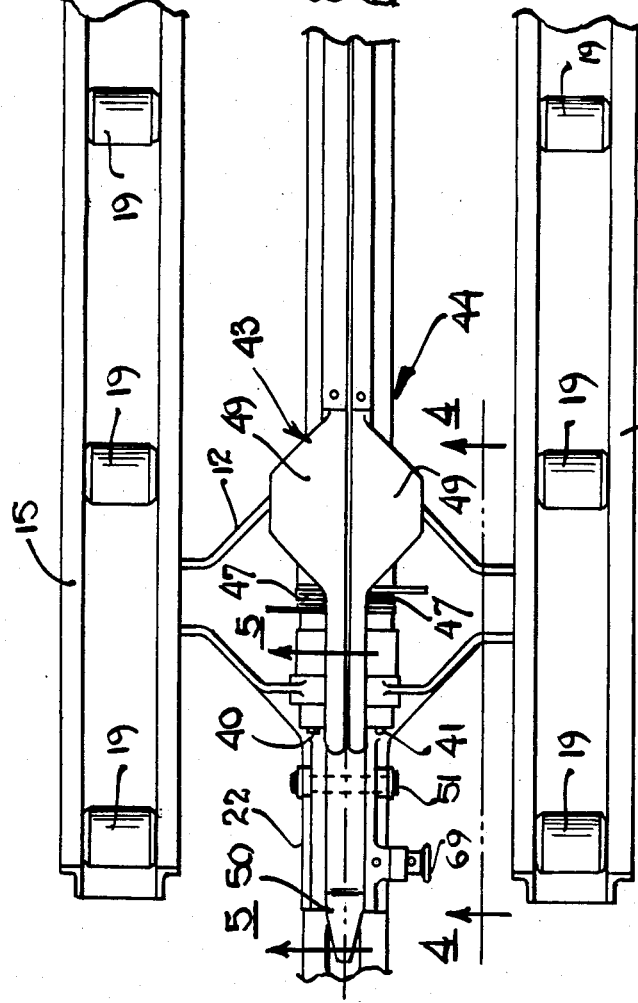
Fig.5A
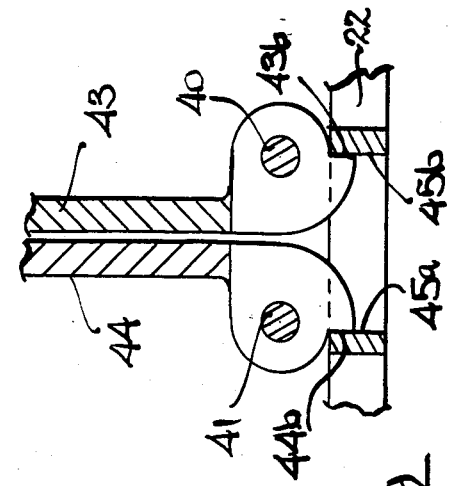
Fig.9
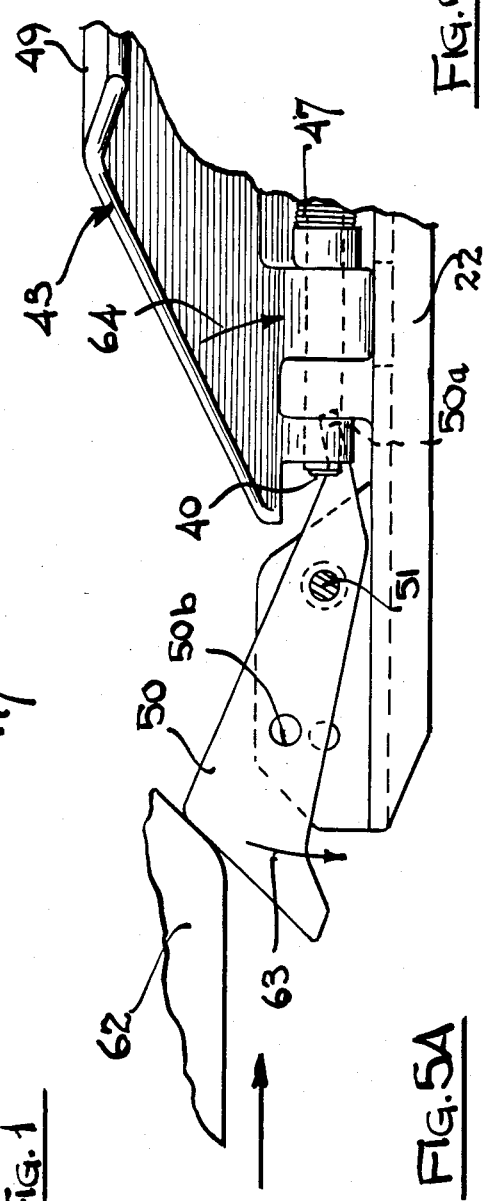

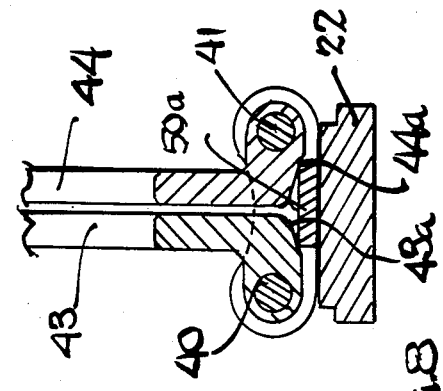
Fig. 7
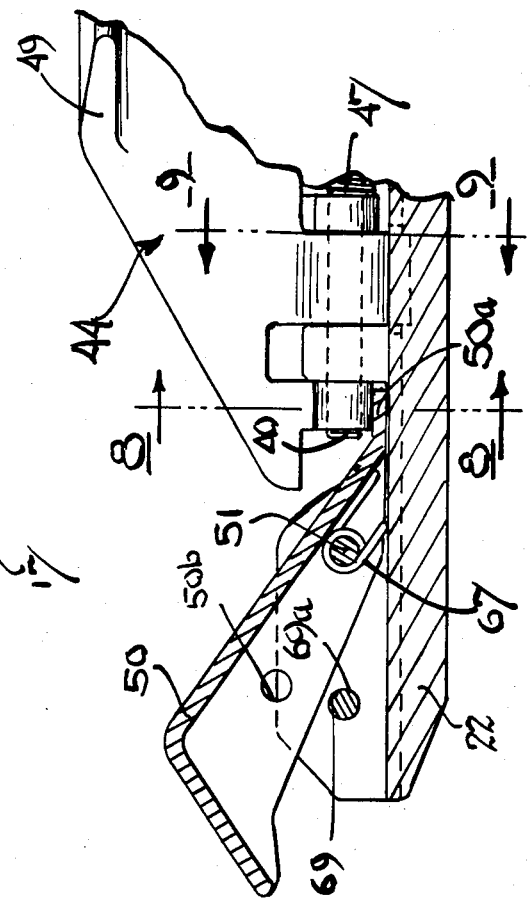
Fig. 8
Fig. 5
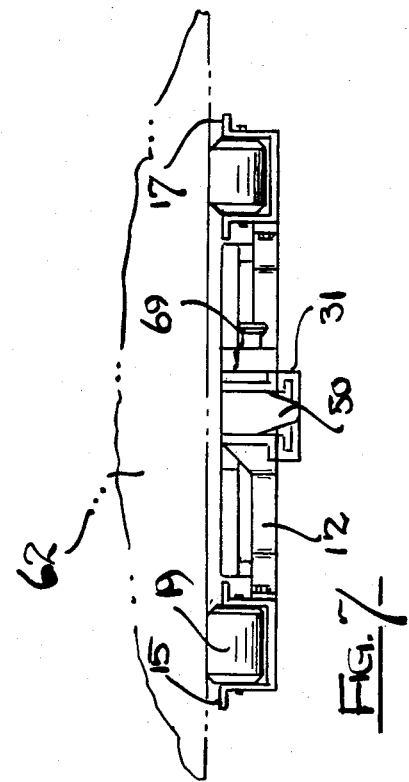
Fig. 2
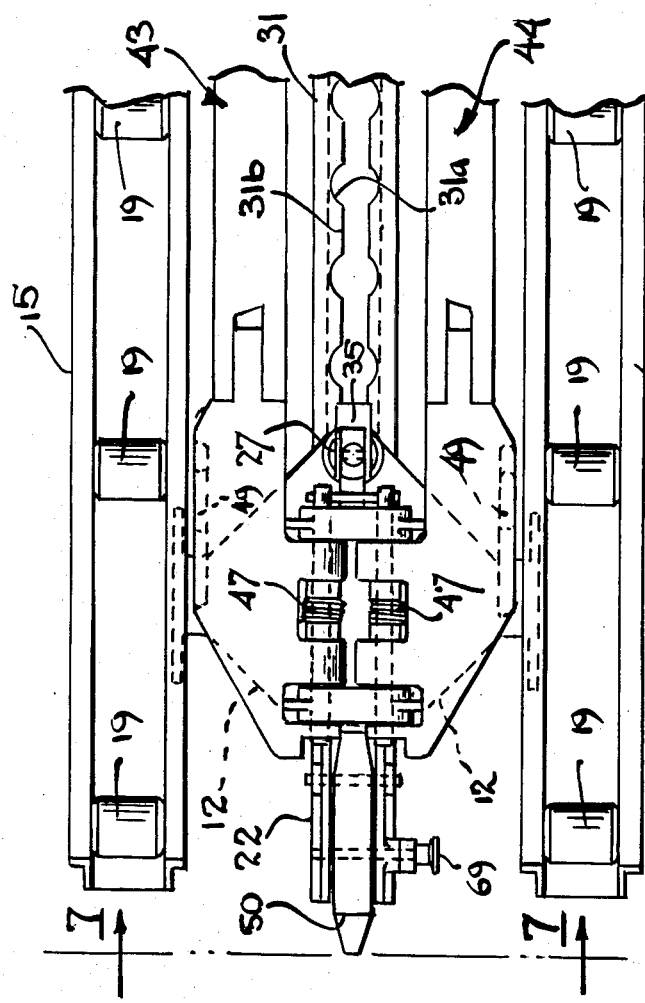

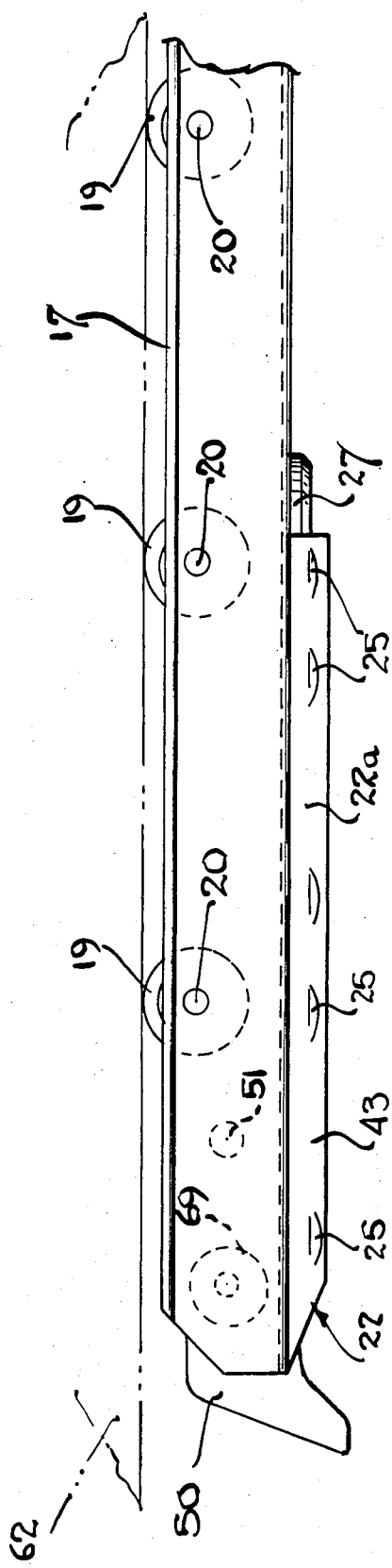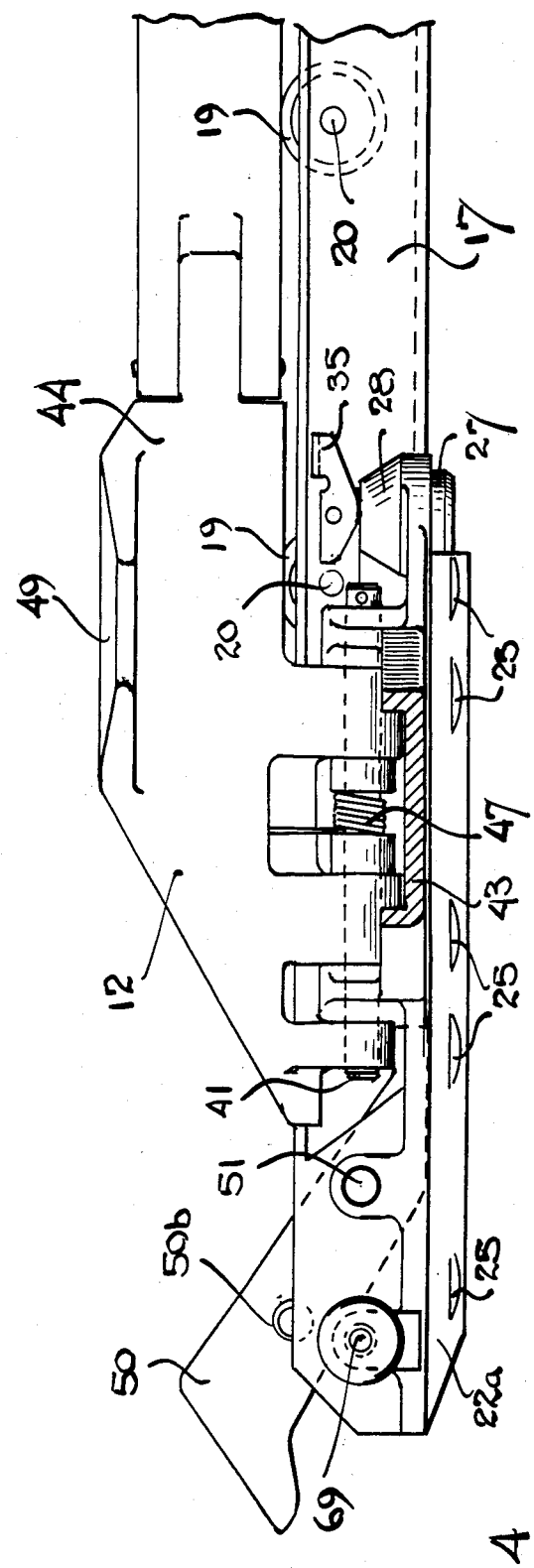

PALLET RESTRAINT MECHANISM FOR CARGO LOADING SYSTEM

This invention relates to a pallet restraint mechanism for a cargo loading system and more particularly to such a device which automatically adjusts itself to accommodate either single or double width pallets or containers.

In U.S. Pat. No. 4,462,493 assigned to Ancra Corporation, the assignee of the present application, a roller rail assembly for use in a cargo loading system is described for loading cargo loaded pallets into a vehicle such as an aircraft. This system employs a roller rail assembly which is removably mounted in a track or channel assembly having alternate cut out portions and lip portions. There is a need to load both less than full width and full width pallets and containers onto the same aircraft as the situation may demand. Presently, this can only be accomplished by setting up the loading tracks individually in advance for handling one or the other width pallet. This is somewhat time consuming and requires the handlers to manually set the tracks for the different width pallets. The system of the present invention obviates the need for manually arranging the tracks for one pallet width or the other by automatically adapting itself to achieve this end result in response to the pallets or containers, as they are being loaded.

The system of the present invention can operate with a roller rail system mounted in a track or channel assembly having alternate cut out portions and lip portions such a described in the aforementioned U.S. Pat. No. 4,462,493. The present system is capable of automatically adapting to the loading of either less than full width or full width pallets and containers.

This improved end result is achieved in the present invention by employing a pair of similar wing members which are spring urged to an upright position opposite each other. These wing members each have an arm extending normally from a support plate each of these amrs engaging the side ledge of a half width pallet or container when in such upright position, thereby retaining such pallet or container. A camming member is provided which has a camming arm which engages camming surfaces on the bottom of each of the wing members. This camming member is spring urged against such camming surfaces. When a full width container or pallet is loaded, it abuts against the camming member driving this member downwardly so that it in turn through its camming arm drives the wing members apart to a flattened position so that the container or pallet can ride thereover. Latching mechanisms are provided to latch the wing members in either their upright or flattened position as may be desired.

It is therefore an object of this invention to enable the automatic loading of either full width or half width pallets or containers in a cargo loading system.

It is a further object of this invention to provide a device which enables a cargo loading system to either retain the edges of a pair of half width containers or pallets or to permit the loading of a full width container or pallet without the need for manual adjustment.

Other objects of the invention will become apparent as the description proceeds in connection with the accompanying drawings of which:

FIG. 1 is a top plan view of a preferred embodiment of the invention;

FIG. 2 is a top plan view of a portion of the preferred embodiment illustrating the device with its cam member fully actuated to bring the wing members to an open position;

FIG. 4 is a view taken along the plane indicated by 4—4 in FIG. 1;

FIG. 5 is a cross sectional view taken along the plane indicated by 5—5 in FIG. 1;

FIG. 5A is a view similar to that of FIG. 5 showing the cam member in the process of being actuated by a container or pallet being loaded;

FIG. 6 is a side elevational view of the preferred embodiment with the cam member in the fully actuated position;

FIG. 7 is a view taken along the plane indicated by 7—7 in FIG. 2;

FIG. 8 is a cross sectional view taken along the plane indicated by 8—8 in FIG. 5; and FIG. 9 is a cross sectional view taken along the plane indicated by 9—9 in FIG. 5.

Figure 7A:
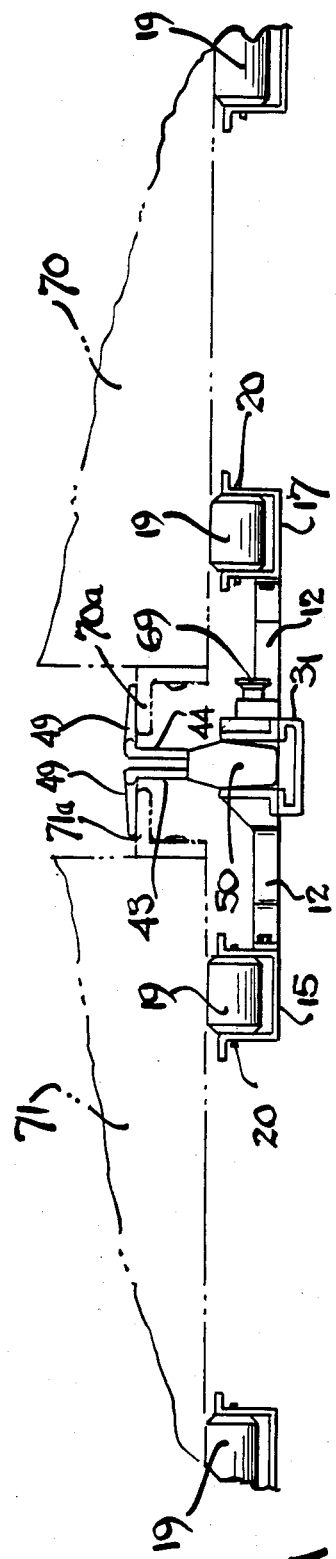
FIG. 7A is a view taken from the same position as FIG. 7 but showing the wing members retaining a pair of half size pallets.

Referring now to the Figures, a preferred embodiment of the invention is illustrated. A frame structure 11 includes a pair of cross arm members 12 and 14 on which similar opposing tracks 15 and 17 are fixedly supported. A plurality of roller wheels 19 are rotatably supported in tracks 15 and 17 on axles 20 which are fixedly supported between the sides of the tracks. Frame 11 also includes central bar portions 22 attached to the cross arm members 12 and 14, each of which has a longitudinal strip 22a which extends therefrom. Extending outwardly from the opposite sides of the strip 22a are a plurality of arcuate lugs 25. A circular plunger 27, as best can be seen in FIG. 4, is slidably mounted in housing 28 formed in the central bar portion 22 of the frame. Plunger 27 is urged upwardly into the housing portion by a spring (not shown). The unit is attached to track 31 as shown in FIGS. 2, 7 and 7A. This track is fixedly attached to the floor of a vehicle such as an aircraft in which cargo is to be loaded. As can be seen in FIG. 2, track 31 has a plurality of spaced alternate notch portions 31a and flange portions 31b formed therein. The frame 11 is removably attached to the track by sliding the lugs 25 of frame portion 22 into the track with plunger 27 being spring urged upwardly to its unactuated "up" position. "Up" positioning of the plunger is achieved by rotating camming lever 35 counterclockwise 45° from the position shown in FIG. 4, which permits the plunger to move upwardly. The frame is moved until lugs 25 are beneath selected flange portions 31b of the track and plunger 27 is directly above one of the notch portions 31a of the track. Camming arm 35 is then rotated to the position shown in FIG. 4 thereby driving plunger 27 down into the notch portion of the track. In this position, plunger 27 operates as a shear lug restraining the frame 11 against both longitudinal and transverse movement. At the same time, lugs 25 operate as tension lugs, restraining movement of the frame relative to the track in a vertical direction. This type of retaining mechanism is well known in the art and is described for example in U.S. Pat. No. 3,605,637 assigned to Ancra Corporation, the assignee of the present application. For convenience of illustration, only the retaining mechanism adjacent to arm member 12 is shown, there being a similar retaining mechanism adjacent to arm member 14.

Pivotally supported on a pair of shafts 40 and 41 on the ends of the frame adjacent to arm member 12 and on a pair of similar shafts 40 and 41, on the portion of the frame adjacent to arm member 14 are a pair of similar wing members 43 and 44. These wing members are urged towards each other to an upright position by means of springs 47 mounted on shafts 40 and 41 (see FIGS. 1 and 9). The wing members have bottom surfaces 43b and 44b which abut against the side walls 45a and 45b of slot 45 formed in the bottom wall of the frame thereby limiting the travel of the wing members at their spring urged upright position. The wing members 43 and 44 have pairs of outwardly extending clamping arms 49 there being a first pair of such clamping arms near arm member 12 and a second pair of such clamping members near arm member 14. The clamping arms of each wing member are interconnected by central bars 48.

A cam arm 50 is pivotally supported on each of the opposite ends of the frame on an associated pin member 51. Cam arms 50 have cams 50a on one end thereof, these cams engaging camming surfaces 43a and 44a on the bottoms of wing members 43 and 44 (See FIG. 8). When cam arm 50 is driven by a container 62 being loaded into the vehicle as shown in FIG. 5A, the arm is driven as indicated by arrow 63 which causes cam 50a to drive upwardly against surfaces 43a and 44a. This willl cause the wing members 43 and 44 to move away from each other as indicated in FIG. 5A by arrow 64 until they are lying in a spread apart flat position as shown in FIG. 2, thereby permitting the container to ride thereover. In the absence of such downward actuation, cam arm 50 is urged toward its downward position by means of spring 67 which is mounted on pin member 51, as shown in FIG. 5. This assures that cam 50a is urged against surfaces 43a and 44a but does not drive the cam arm downward in view of the opposing action of springs 47. Cam arm 50 may be latched in its downward position by means of pin member 69 which fits through aperture 50b formed in the side wall portions of the arm and is mounted in aperture 69a formed in the frame. The arm member may also be latched in an "up" position by inserting the pin below this member as shown in FIG. 5 in which case the bottom edges of the arm will abut against the pin to maintain this "up" condition. In this manner, the wing members 49 may be retained in either their upright or flattened positions as may be desired.

Figure 3:
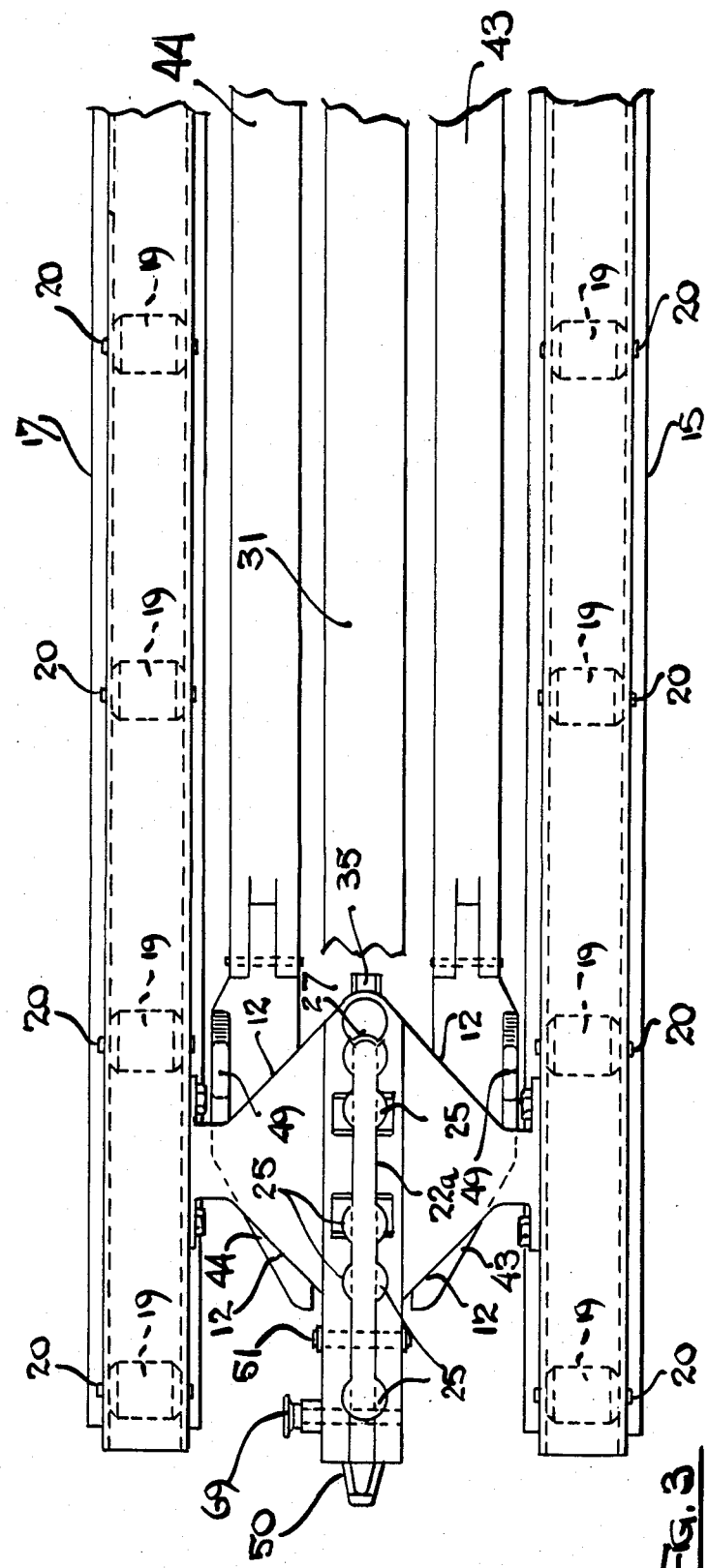
FIG. 3 is a bottom plan view of a portion of the preferred embodiment with the cam member fully actuated.

The device is shown with the wing members latched in the upright position in FIG. 4 and with the wing members latched in a spread apart flattened position in FIG. 3. As shown in FIG. 7 a single wide container has been loaded over the device, the wing members having been actuated to the open flattened position. FIG 7A illustrates a pair of containers 70 and 71 loaded onto the device of the invention with the edge lips 70a and 71a of these containers being retained by the clamping arms 49 of the wing members.

While the invention has been described and illustrated in detail, it is to be clearly understood that this is intended by way of illustration and example only and is not to be taken by way of limitation. The spirit and scope of the invention being limited only by the terms of the following claims.

I claim:

1. A device for use in alternatively loading either predetermined wider or narrower cargo onto the floor of a vehicle and restraining such loaded cargo comprising:
   a frame structure including roller means for supporting said cargo,
   means for mounting said frame structure on the vehicle floor,
   a pair of similar wing members,
   means for pivotally mounting said wing members on said frame structure for movement between an upright position whereat the wing members are directly opposite each other and a spread apart flattened position,
   spring means for urging said wing members towards the upright position, and
   cam means for driving said wing members to the spread apart flattened position, said cam means including a cam arm pivotally mounted on said frame structure, said cam arm engaging said wing members, said cam arm being driven by said wider cargo to drive said wing members to the flattened position to permit the cargo to ride thereon,
   said wing members having clamping means formed thereon for retaining said narrower cargo in position on said frame structure when the wing members are in the upright position.

2. A device for use in alternatively loading either wider or narrower cargo onto the floor of a vehicle and restraining such loaded cargo comprising:
   a frame structure including a pair of cross arm members, a pair of oppositely positioned tracks attached to the opposite ends of said cross arm members, and roller means rotatably mounted in said tracks,
   means for removably mounting said frame structure on said vehicle floor, and
   a pair of similar wing members pivotally mounted on said frame structure for pivotal movement between an upright position whereat the wing members are directly opposite each other and a spread apart flattened position,
   spring means for urging said wing members towards the upright position, and
   cam means for driving said wing members to the spread apart flattened position, said cam means including a cam arm pivotally mounted on said frame structure, said cam arm having a cam on one end thereof, said wing members having camming surfaces on the bottom portions thereof which are engaged by said cam, said arm being actuated to drive said wing members to the flattened position by said wider cargo as it is being loaded,
   said wing members having clamping arm means formed thereon for retaining said narrower cargo in position on said frame structure when the wing members are in the upright position.

3. The device of claim 2 and further including spring means for urging the cam of said cam means against the camming surfaces of said wing members.

4. The device of claim 2 wherein the wider cargo is a full predetermined width and the narrower cargo has a width which is less than said predetermined width.

5. The device of claim 2 and further including means formed in said frame structure for limiting the travel of said wing members to said upright position thereof.

6. The device of claim 5 wherein said travel limiting means comprises slots formed in said frame structure, said wing members abutting against the walls of said slots in said upright position.

7. The device of claim 2 and further including pin means slidably mounted in said frame structure for latching said cam arm alternatively in a downward position to retain the wing members in the flattened position or an up position to retain the wing members in the upright position.

8. The device of claim 2 wherein said means for removably mounting said frame structure on the vehicle floor comprises a track having alternate notch and flange portions formed therein, said track being attached to said floor, a plurality of spaced arcuate lugs extending from opposite sides of said frame structure, a spring urged circular plunger slidably mounted in the frame structure, and means for driving said plunger into one of said track notch portions, with the lugs being fitted under flange portions of said track.

* * * * *